US008525650B2

(12) United States Patent
Turgeon et al.

(10) Patent No.: US 8,525,650 B2
(45) Date of Patent: Sep. 3, 2013

(54) REMOTE SHUT-OFF GAS METER

(75) Inventors: Joseph Leonard Turgeon, Raleigh, NC (US); Tod Wallace Bradley, Cary, NC (US); John Carlton Kelly, Omaha, NE (US); Brian William Kochanowicz, Nebraska City, NE (US)

(73) Assignee: Elster American Meter Company, Raleigh, NC (US)

( * ) Notice: Subject to any disclaimer, the term of this patent is extended or adjusted under 35 U.S.C. 154(b) by 646 days.

(21) Appl. No.: 12/775,932

(22) Filed: May 7, 2010

(65) Prior Publication Data

US 2010/0289667 A1 Nov. 18, 2010

Related U.S. Application Data

(60) Provisional application No. 61/178,196, filed on May 14, 2009.

(51) Int. Cl.
*G08C 17/02* (2006.01)
(52) U.S. Cl.
USPC .......................... 340/12.5; 340/12.22; 137/39
(58) Field of Classification Search
USPC .. 340/12.22, 12.3, 12.5; 137/39; 251/129.04
See application file for complete search history.

(56) References Cited

U.S. PATENT DOCUMENTS

| 3,457,835 | A | | 7/1969 | Siebold |
| 4,565,090 | A | * | 1/1986 | Gotanda ........................ 73/198 |
| 4,726,055 | A | * | 2/1988 | Smith ....................... 379/102.01 |
| 5,747,701 | A | | 5/1998 | Marsh et al. |
| 5,777,222 | A | | 7/1998 | Roberts |
| 5,918,618 | A | | 7/1999 | Neupert |
| 5,970,791 | A | | 10/1999 | Barczynski et al. |
| 5,992,439 | A | * | 11/1999 | McGill ....................... 137/15.03 |
| 6,269,829 | B1 | | 8/2001 | Chen et al. |
| 6,657,552 | B2 | | 12/2003 | Belski et al. |
| 6,708,571 | B1 | | 3/2004 | Hopfe et al. |

(Continued)

FOREIGN PATENT DOCUMENTS

| JP | 2002081972 A | 3/2002 |
| WO | 0139222 A3 | 3/2001 |

OTHER PUBLICATIONS

"Water metering systems solutions—Measurement systems, reading systems, and project management", from www.elsteramcowater.com/en/downloads/WMSS.pdf.

(Continued)

*Primary Examiner* — Edwin Holloway, III
(74) *Attorney, Agent, or Firm* — Duane Morris LLP

(57) ABSTRACT

A retrofit system includes a body, a cup and a valve. The body has a top wall and a plurality of side walls defining a opening and a chamber and is configured to be connected to a gas meter such that the chamber is in fluid communication with a chamber of the gas meter. An inlet channel is configured to be in fluid communication with an inlet of a diaphragm disposed within the gas meter and an outlet channel configured to be in fluid communication with an outlet of the diaphragm. The cup is disposed within an aperture located in the top wall and defines compartment configured to receive a radio frequency (RF) controller and a power supply. The valve is connected to one of the inlet or outlet channels and is electrically coupled to the RF controller and the power supply. The valve is configured to close in response to receiving an electrical signal from the RF controller.

17 Claims, 15 Drawing Sheets

(56) References Cited

U.S. PATENT DOCUMENTS

| | | |
|---|---|---|
| 6,897,374 B2 | 5/2005 | Garber et al. |
| 6,904,788 B2 | 6/2005 | Sandford et al. |
| 6,953,046 B2 | 10/2005 | Chen et al. |
| 6,990,414 B2 | 1/2006 | Belke et al. |
| 6,994,309 B2 * | 2/2006 | Fernandez-Sein ....... 251/129.04 |
| 7,059,200 B2 | 6/2006 | Sallee |
| 7,171,852 B2 | 2/2007 | Smich et al. |
| 7,228,726 B2 | 6/2007 | Kates |
| 7,277,027 B2 | 10/2007 | Ehrke et al. |
| 7,290,456 B2 | 11/2007 | Sallee |
| 7,325,782 B2 | 2/2008 | Gebler et al. |
| 7,533,581 B2 | 5/2009 | Sallee |
| 2003/0052790 A1 | 3/2003 | Dunstan |
| 2004/0211462 A1 * | 10/2004 | Chen et al. ...................... 137/39 |
| 2006/0272830 A1 | 12/2006 | Fima |
| 2008/0238714 A1 | 10/2008 | Ehrke et al. |
| 2009/0153357 A1 | 6/2009 | Bushman et al. |

OTHER PUBLICATIONS

"100,000 gas meter network made a reality thanks to Wavenis Technology", from http://www.m2mpremier.com/UploadFiles/Coronis_CS_SmartMetering.pdf.

RPM Series Rotary Gas Meters with Continuous Mechanical Temperature Compensator, American Meter Company, 4 pages, published Mar. 2002.

Enoch, M., "AMR technology helps utility expand service, contain costs", Pipe Line & Gas Industry, Mar. 2000, pp. 97-99.

Elster Amco Profiles, "RVG G10-G25 A New Star in the Metering Program", 2002, vol. 1, 19 pages, from www.elster.com.

Canadian Office Action issued in corresponding Canadian Patent Application No. 2,703,523, by Canadian Intellectual Property Office on Apr. 9, 2013, pp. 1-3.

* cited by examiner

REMOTE SHUT-OFF GAS METER

CROSS-REFERENCE TO RELATED APPLICATIONS

This application claims priority to U.S. Provisional Patent Application No. 61/178,196 filed on May 14, 2009, the entirety of which is herein incorporated by reference.

FIELD OF INVENTION

The disclosed system and method relate to utility meters. More specifically, the disclosed system and method relate to gas meters that may be remotely shut-off.

BACKGROUND OF THE INVENTION

Utility services, such as natural gas service and water service, install meters in the homes or businesses of their customers to monitor the amount of their product, e.g., gas or water, is being used by each customer. These conventional meters include shut-offs to control the flow of the product to the consumer. Whether the customer is a residential or business customer, the utility must be able to control and account for the amount of their product being delivered to each customer. FIG. 1 is an illustration of a conventional gas meter, such as the AC-250 meter available from Elster American Meter Company.

Conventional meters can be located within the home or business, and may not be readily accessible to a representative of the utility for inspection or adjustment. Thus the utility will often need to gain access to the home or business in the event that a shut-off of service is required to be performed. A primary reason for a utility company to cease service is for non-payment of the utility bills by a customer, and thus utility customers may not be forthcoming in allowing a utility company employee into their home or business to shut-off the service.

Remote shut-off of techniques for gas and water meters are known in the art. For example, United States Patent Application Publication No. 2003/0052790 in the name of Dunstan discloses a system and method for communicating flow information for a service line. International Publication No. WO 01/39222 also discloses an emergency shut-off system for service lines. Other systems are also available to remotely shut-off a utility service. However, these systems all utilize complex arrangements of parts, often requiring the purchase of a new meter which adds to the overall expense of implementation. In addition, the implementation of some prior art remote shut-off features require the recertification of the meter as significant modification of the meter is necessary. This also adds to the cost for utility companies. Accordingly, an improved system for shutting off gas service is desirable.

SUMMARY OF THE INVENTION

A gas meter is provided that includes a first body portion having a bottom wall and a plurality of side walls that together define an opening and a chamber. A diaphragm is disposed within the chamber and includes an inlet port and an outlet port. A second body portion is provided that has a top wall and a plurality of side walls that together define a second opening and a second chamber. The second body portion is connected to the first body portion such that the first and second chambers are in fluid communication with each other, with the top wall defining an aperture. The second body portion includes an inlet channel in fluid communication with the inlet of the diaphragm and an outlet channel in fluid communication with the outlet of the diaphragm. A cup is disposed within the aperture, the cup defines a compartment sized and configured to receive a radio frequency (RF) controller and a power supply. A valve is connected to one of the inlet channel or the outlet channel and is electrically coupled to the RF controller and the power supply. The RF controller is configured to open and close the valve in response to an electrical signal received from the RF controller.

A method of retrofitting a gas meter is also provided that includes removing a cover of a gas meter to expose an internal chamber of the meter. The retrofit system is secured to the gas meter to cover the internal chamber. The retrofit system includes a first body portion having a bottom wall and a plurality of side walls that together define an opening and a chamber. A diaphragm is disposed within the chamber and includes an inlet port and an outlet port. A second body portion is provided that has a top wall and a plurality of side walls that together define a second opening and a second chamber. The second body portion is connected to the first body portion such that the first and second chambers are in fluid communication with each other, with the top wall defining an aperture. The second body portion includes an inlet channel in fluid communication with the inlet of the diaphragm and an outlet channel in fluid communication with the outlet of the diaphragm. A cup is disposed within the aperture, the cup defines a compartment sized and configured to receive a radio frequency (RF) controller and a power supply. A valve is connected to one of the inlet channel or the outlet channel and is electrically coupled to the RF controller and the power supply. The RF controller is configured to open and close the valve in response to an electrical signal received from the RF controller.

BRIEF DESCRIPTION OF THE DRAWINGS

These and other features and advantages of the present invention will be more fully disclosed in, or rendered obvious by, the following detailed description of the preferred embodiments of the invention, which are to be considered together with the accompanying drawings wherein like numbers refer to like parts and further wherein.

DETAILED DESCRIPTION

Figure 1:
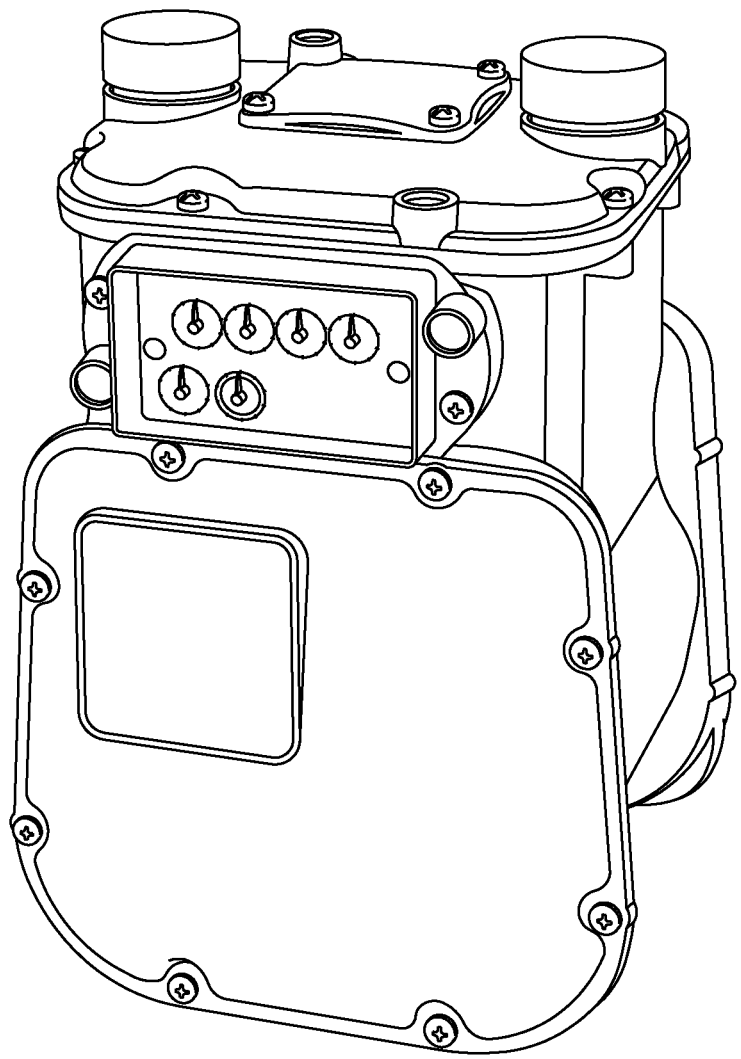
FIG. 1 is a front view of a conventional gas meter.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. In the claims, means-plus-function clauses, if used, are intended to cover the structures described, suggested, or rendered obvious by the written description or drawings for performing the recited function, including not only structural equivalents but also equivalent structures.

An improved gas meter having remote shut-off capability formed in accordance with one embodiment of the invention may be configured with an extended top assembly that defines a chamber for receiving a shut-off valve assembly. The extended top assembly also includes a partition that, when the extended top assembly is attached to the body of the gas meter, seals the cavity of the gas meter so as to maintain the pressure within the meter cavity. The partition defines a compartment that is sized and configured to receive a radio frequency (RF) controller or transceiver as well as additional components such as a power supply therein. A cover seals the contents of the compartment and may be sized and configured to promote transmission and reception of RF signals. Unauthorized access to the compartment and the RF controller may be restricted by attaching the cover with anti-tamper devices such as tamper plugs. Advantageously, the cover enables a technician to gain access to the electronic components disposed within the chamber without disturbing the operation of the meter.

Figure 2:
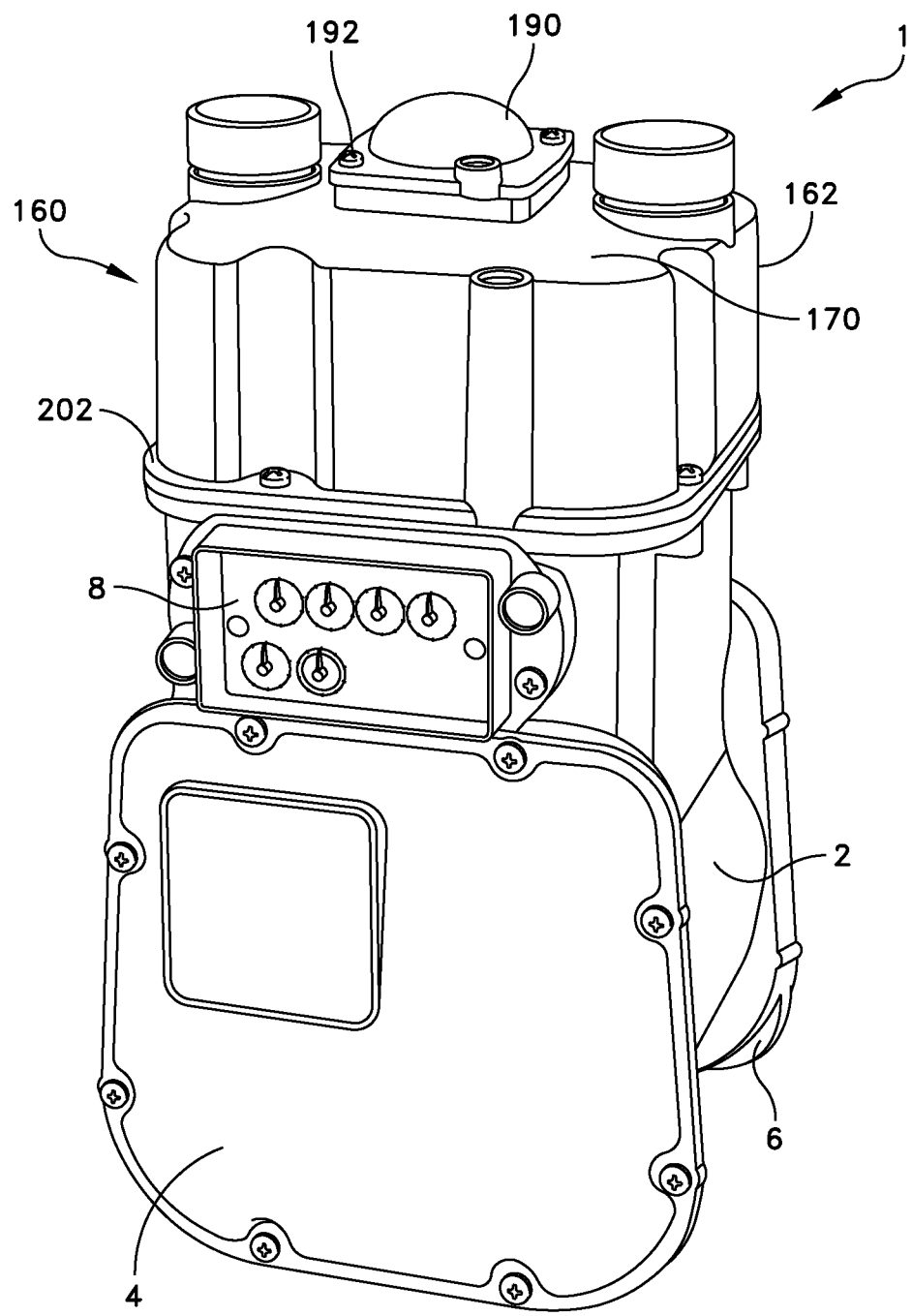
FIG. 2 is a front view of an improved gas meter with RF shut-off capability.
Figure 16:
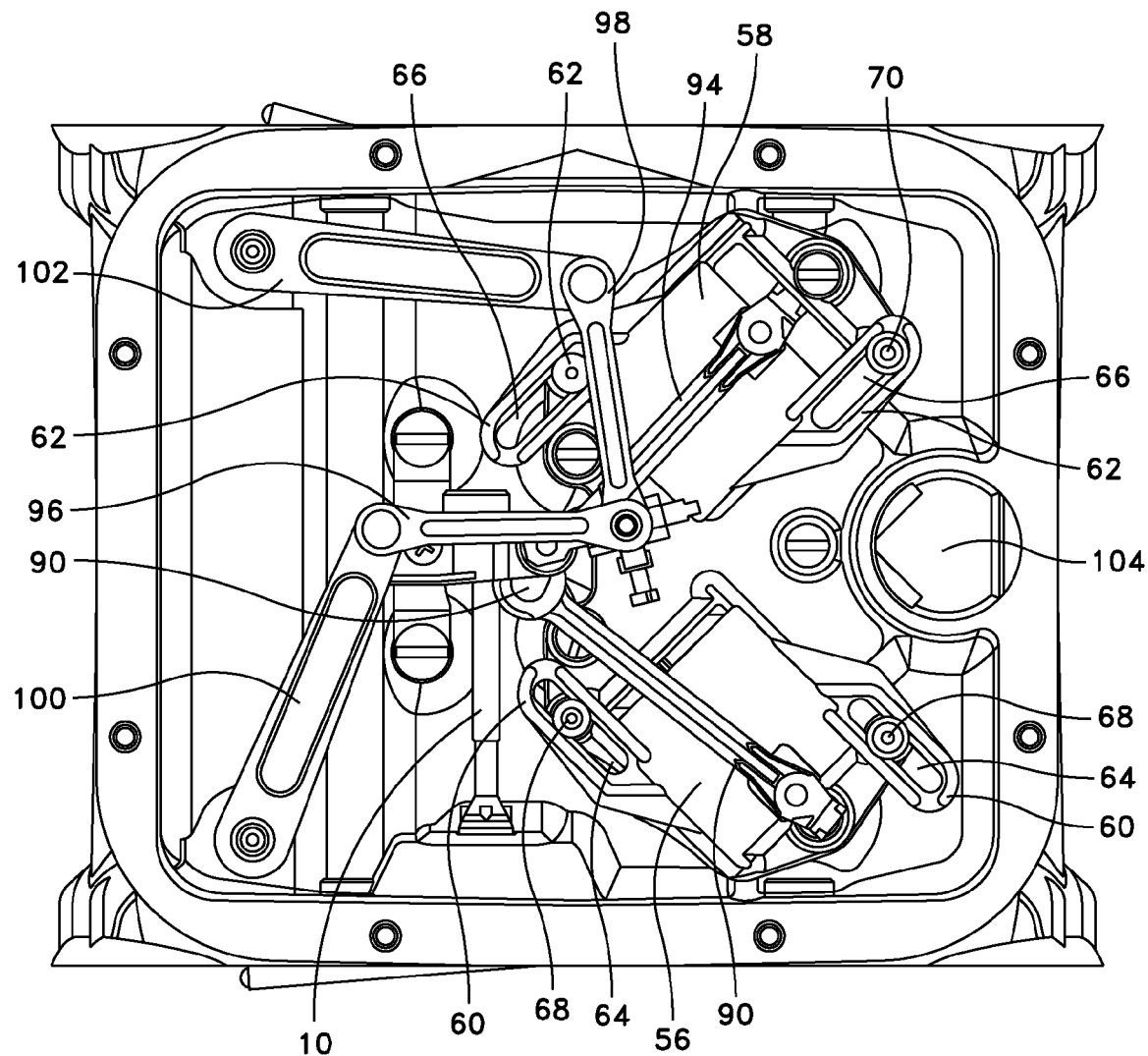
FIG. 16 is a top view of the gas meter body in accordance with FIG. 14 with the valve components installed.

The remote shut-off system of the present invention may be utilized on a metering device 1, e.g., a gas meter, having gas meter body 2 (FIG. 2) that includes a register or other display 8 disposed on the front of the body 2. The display may be driven by an axle shaft 10 as illustrated in FIG. 16. A gasket may be disposed between the extended top assembly 160 and the gas meter body 2 to maintain constant pressure within the body 2 of gas meter 1. Additionally, gaskets may be disposed between the front cover 4 and back cover 6 to maintain the pressure within the body 2 of gas meter 1. Each of the gaskets may be formed from cork, polymer, plastic, or other material that provides a moisture and gas barrier.

The extended top assembly 160 may be bolted onto the periphery of the top wall surface of the body 2. The extended top body 162 may include a flange 202 for securing the extended top body assembly 160 to gas meter body 2. When the extended top assembly 160 is secured to gas meter body 2, the gas outlet channel 206 may align with the outlet 104 of the gas meter body 2.

Figure 12:
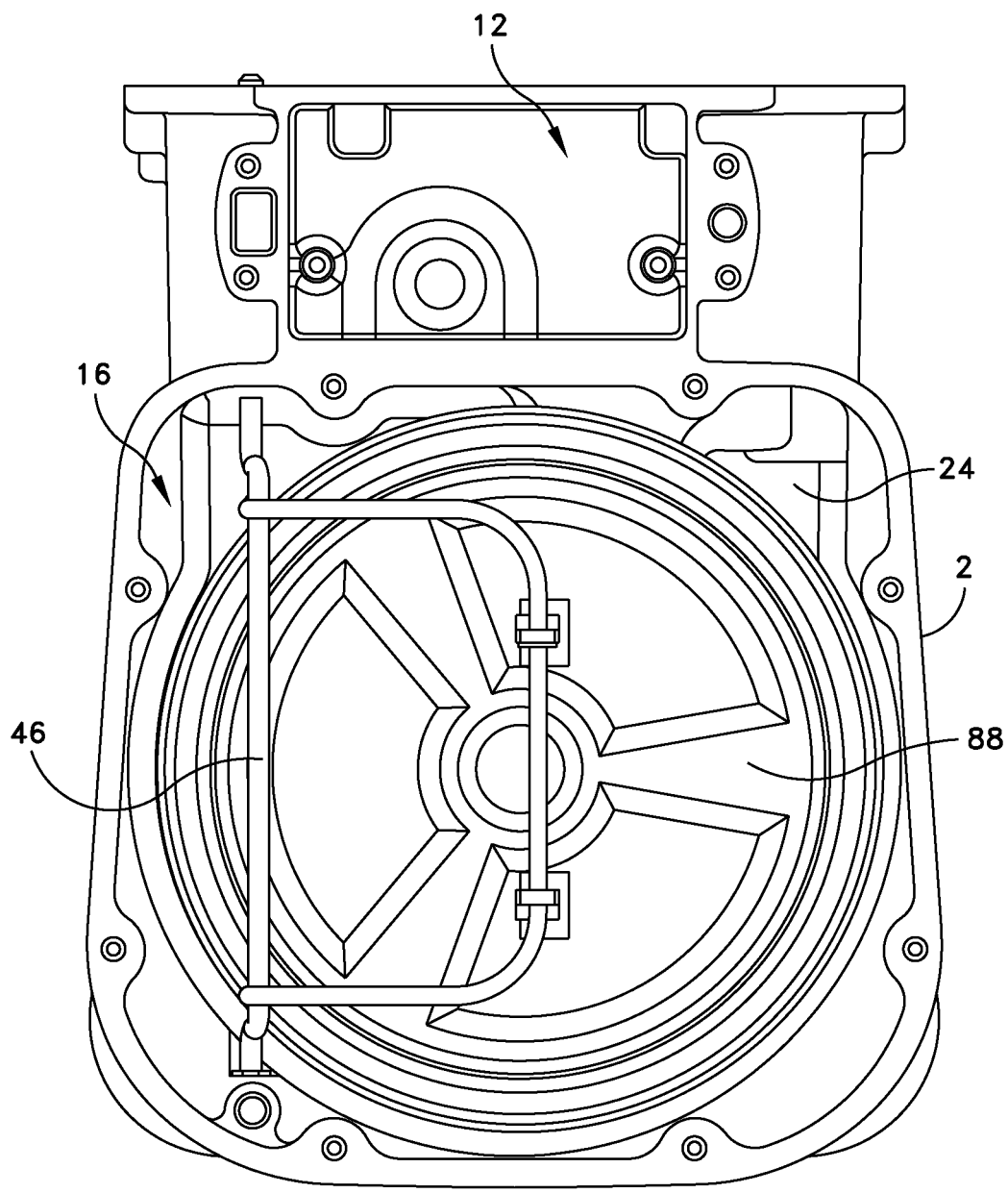
FIG. 12 is a front view of a gas meter body with the front cover and extended top assembly removed.
Figure 14:
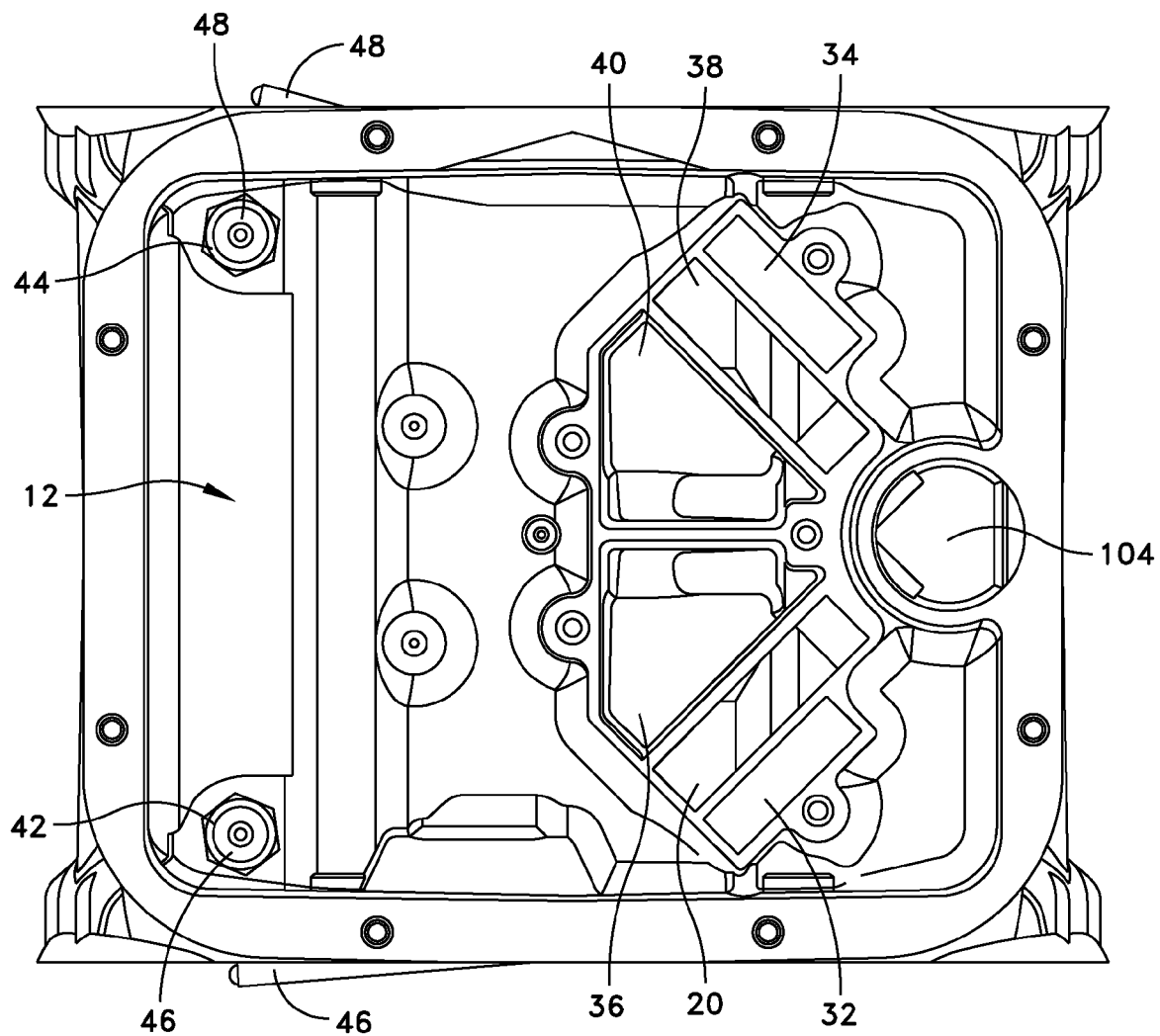
FIG. 14 is a top view of a gas meter body with the extended top assembly and front and back covers removed.

FIG. 12 illustrates the front of the gas meter 1 with the front cover 4, display 8, and extended top assembly 160 removed. As shown in FIG. 12, a diaphragm 88 is disposed within the front of a central partition 24 that divides the gas meter body 2 into a front chamber 16 and a back or rear chamber 18 (not shown). The diaphragm 88 in the front of the gas meter 1 is connected to the front flag rod 46 and the diaphragm in the back of the gas meter 1 is connected to the rear flag rod 48. As best seen in FIG. 14, the front flag rod 46 is connected to a bearing 42 configured to support the upper end of the front flag rod, and the rear flag rod 48 is connected to a bearing 44.

Figure 13:
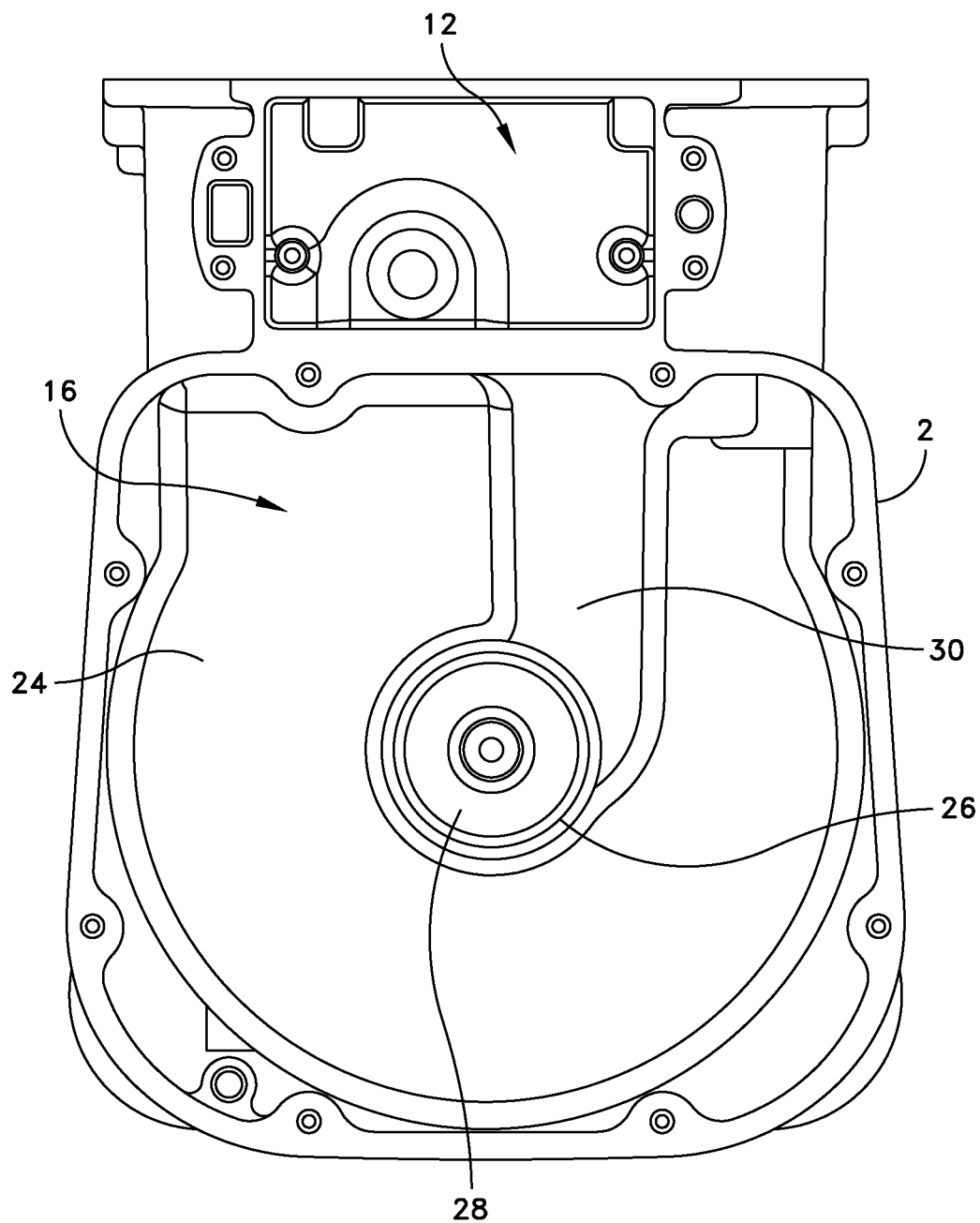
FIG. 13 is a front view of the gas meter body with the front cover, extended top assembly, the diaphragm, and flag rods removed.

FIG. 13 is the same view of the gas meter 1 illustrated in FIG. 12, with the diaphragm 88 and the flag rod 46 also having been removed. Each of the front and back diaphragms 88 are connected to the central partition 24 at a cylindrical flange 26, which defines a circular passageway 28. When connected to the cylindrical flange 26, the internal chamber of the diaphragm 88 is connected to the circular passageway 28 that is in fluid connection with a crossover passageway 30 defined by the central partition 24 of the gas meter body 2.

Figure 15:
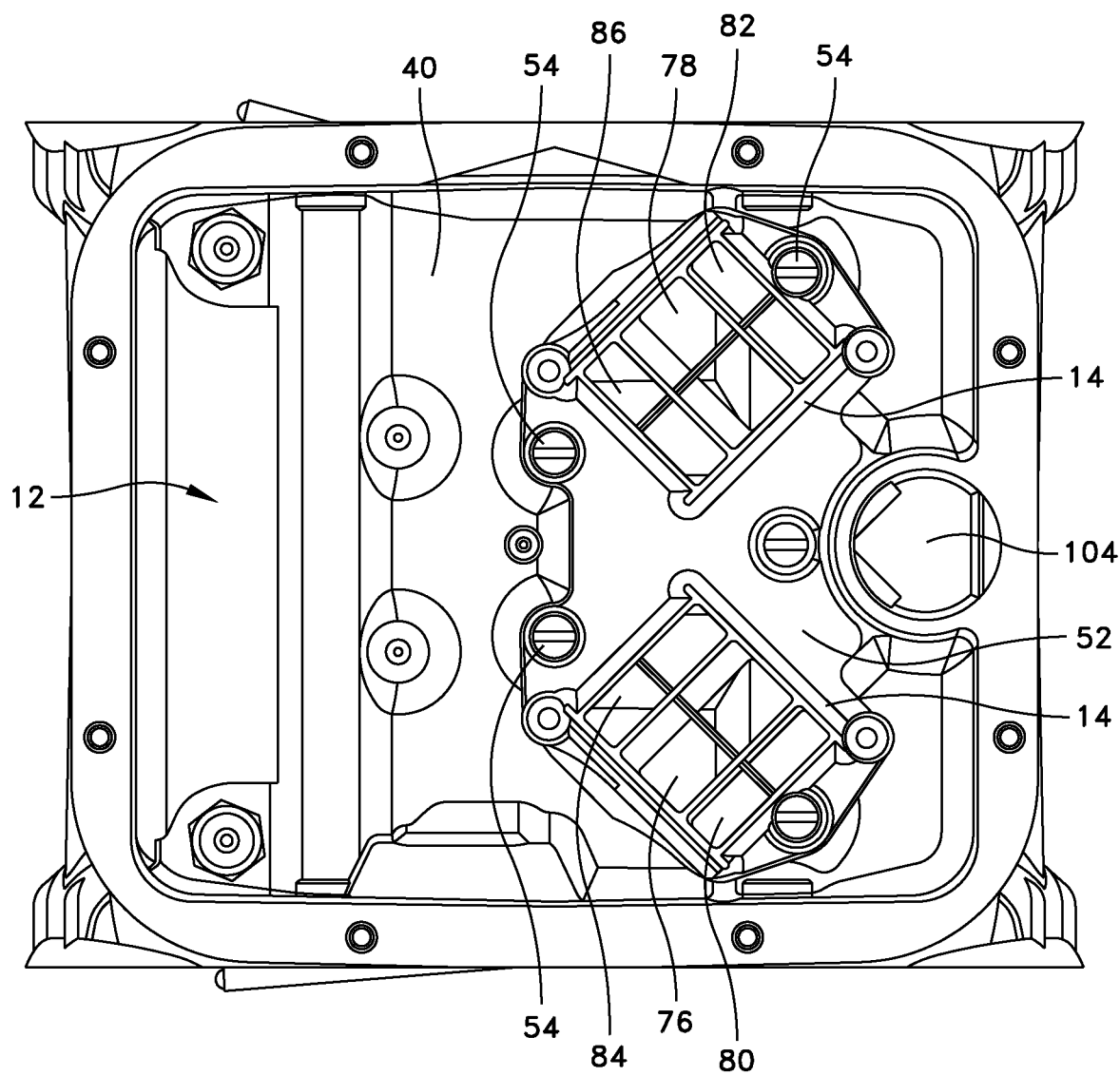
FIG. 15 is a top view of a gas meter body in accordance with FIG. 14 with the valve seat installed.

Referring now to FIGS. 14-16, which show top plan views of the gas meter body 2 with the extended top assembly 160 removed, the valve actuating components of the gas meter 1 are now described. FIG. 14 is a plan view of the gas meter 1 with the valve components removed. As shown in FIG. 14, a valve plate 40 separates the measuring chambers 16, 18 of the gas meter body 2 from the upper chamber 12, which includes the valves as described below. Valve plate 40 defines a plurality of ports 20, 22, 32, 34, 36, 38 that, in conjunction with valve covers 56, 58 illustrated in FIG. 16, control the flow and measurement of gas through the gas meter 1.

Outlet ports 20, 22 may be integrally formed within valve plate 40 and are in fluid communication with the outlet channel 104. Outlet port 20 is located in front of the central partition 24, and outlet port 22 is located in back of the central partition 24. Port 36 is located adjacent to port 20 and is in fluid communication with the crossover passageway 30 defined by the central partition 24 on the front side of the gas meter 1. Port 38 is located adjacent to port 22 on the back side of the gas meter 1 and is in fluid communication with the crossover passageway 30 defined by the central partition 24 on the back side of the gas meter 1.

Port 32 is disposed adjacent to port 20 in the valve plate 40 and connects the upper chamber 12 to the space in the front chamber 16 of the gas meter body 2 that is external of diaphragm 88. Similarly, port 34 is disposed adjacent to port 26 in the valve plate 40 and connects the upper chamber 12 to the space in the rear chamber 18 of the gas meter body that is external of the diaphragm 88.

FIG. 15 is a plan view of the upper chamber 12 with a valve seat 52 secured in place over the valve plate 40. As shown in FIG. 15, valve seat 52 includes a plurality of passages 76, 78, 80, 82, 84, 86 that respectively register with ports 20, 22, 32, 34, 36, 38 formed in the valve plate 40. The valve seat 52 may be secured to the valve plate 40 by a flexible epoxy cement and/or a plurality of screws 54.

Figure 3:
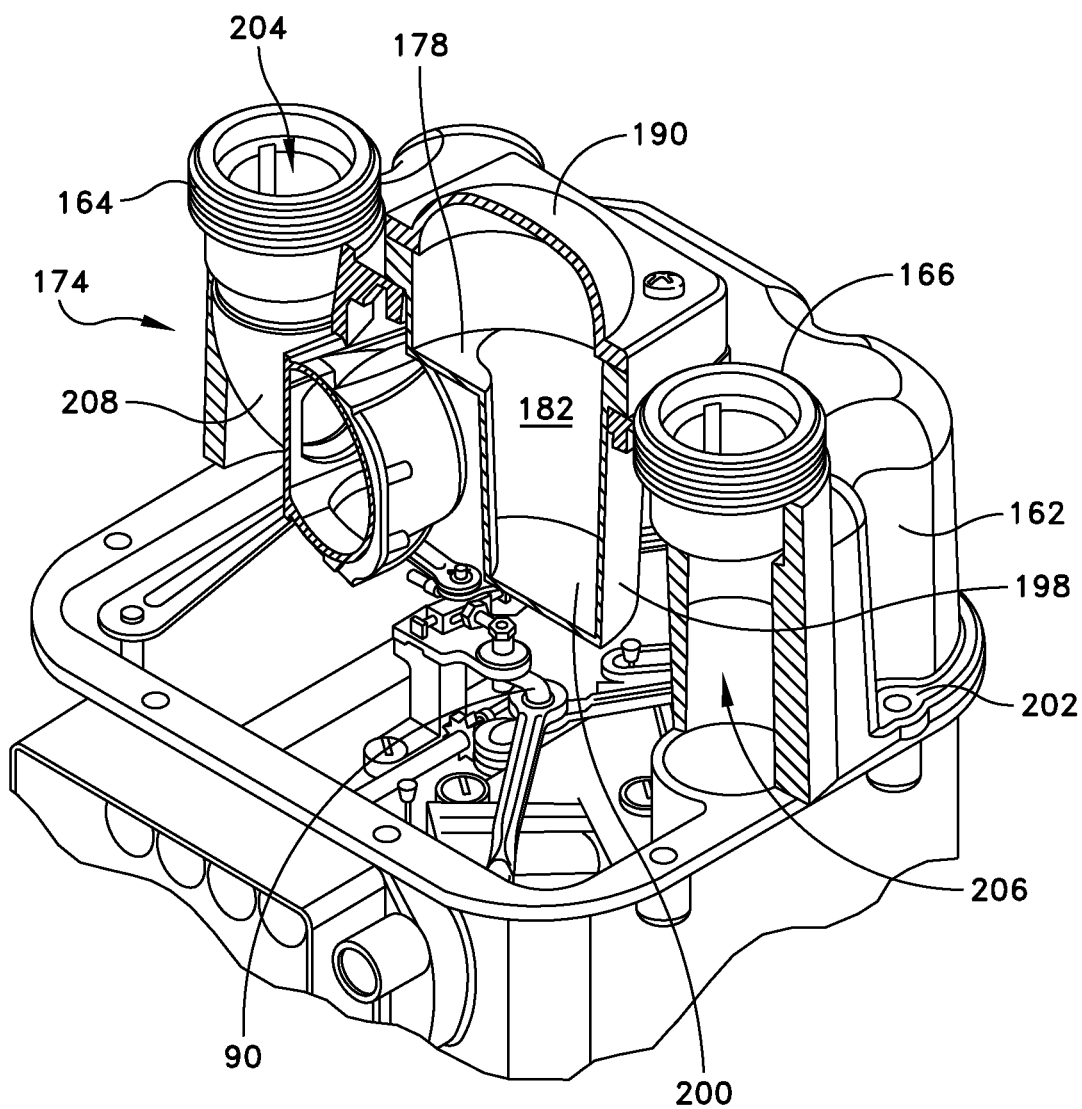
FIG. 3 is an isometric sectional view of an extended top assembly of an improved gas meter with RF shut-off capability.

Turning now to FIG. 16, each valve cover 56, 58 may be provided with a pair of integral arms 60, 62 each having slots 64, 66 configured to receive guide pins 68, 70 that are fixed to the valve seat 52 to maintain alignment and linear motion of valve covers 56, 58. Valve cover 56 is connected to the front crank arm 92, and valve cover 58 is connected to the rear crank arm 94. Each of the front and rear crank arms 92, 94 are connected to a crank 90 as best seen in FIG. 3. The crank 90 is connected to front and rear links 96, 98 which are respectively connected to a front flag arm 100 and a rear flag arm 102. The front flag arm 100 is coupled to the flag rod 46 of the front chamber 16 of the gas meter body 2, and the rear flag arm 102 is coupled to the flag rod 48 of the rear chamber 18 of the gas meter body 2.

Valve covers 56, 58 control of the flow of gas through the gas meter 1 in conjunction with the flag rods 46,48, links 96, 98, and crank arms 92, 94. For example, valve cover 56 has its center section connected over outlet port 20 and alternately connects port 32 and 36 to port 20. Similarly, valve cover 58 has its center section connected over outlet port 22 and alternately connects the ports 34, 38 to the outlet port 22.

With reference to FIGS. 12-16, the flow of gas through gas meter 1 is now described. Flag rod 46 is connected to flag arm 100 and flag rod 48 is connected to flag arm 102. Flag rod 46 is driven by the diaphragm 88 at the front of the gas meter body 2, and flag rod 48 is driven by the diaphragm 88 at the back of the gas meter body 2. Crank arm 92, which is connected to valve cover 56, is also connected to flag arm 100 through crank 90 and link 96. Crank arm 94, which is connected to valve cover 58, is also connected to flag arm 102 through crank 90 and link 98. Accordingly, the flag arm 100 is driven by the diaphragm 88 at the front of the gas meter body 2 by virtue of flag rod 46 causing the valve cover 56 associated with the diaphragm 88 to move from one position to another, and flag arm 102 is driven by the diaphragm at 88 at the back at the back of the gas meter body 2, causing the valve cover 58 to move.

In the position shown in FIG. 16, gas is being admitted through port 34 in the valve plate 40 and passage 82 formed in the valve seat 52 to the space between the back cover 6 and the outside of the diaphragm 88 in the rear chamber 18 at the back of the gas meter body 2. This gas compresses the rear diaphragm 88 and moves flag arm 98 in a clockwise direction. The compression of the diaphragm 88 in the rear chamber 18 at the back of the gas meter 2 forces gas through port 38 and into the outlet port 22 to the outlet channel 104 of the gas meter body 2. At the same time, gas is being admitted into port 36 to the inside of the diaphragm 88 in the front chamber 16 at the front of the meter, tending to extend the diaphragm 88 at the front of the meter 1 and to move the flag arm 100 in a clockwise direction. This forces the gas in the space between the diaphragm 88 at the front of the meter into port 32 and through outlet port 20 to the outlet channel 104.

As the diaphragms 88 in the front and back of the gas meter 1 expand and contract due to the flow of gas into the upper chamber 12, they cause flag rods 46, 48 to rotate clockwise and counterclockwise. The rotation of flag rods 46, 48 is translated to flag arms 100, 102 through links 96, 98 to crank 90 and ultimately to crank arms 92, 94, which move valve covers 56, 58. As described above, the motion of valve cover 56 is guided by slots 64 of the integral arms 60, which are engaged with pins 68. Similarly, valve cover 58 is guided by slots 66 of integral arms 62 that are engaged with pins 70. In one position, valve cover 56 couples together ports 20 and 32, and valve cover 58 couples together ports 22 and 38. In another position, valve cover 56 couples together ports 20 and 36, and valve cover 58 couples together ports 22 and 34. In this manner, gas is received in the upper chamber 12 and is directed through the internal channels and ports of the gas meter 1 until it is received in outlet channel 104.

Figure 4:
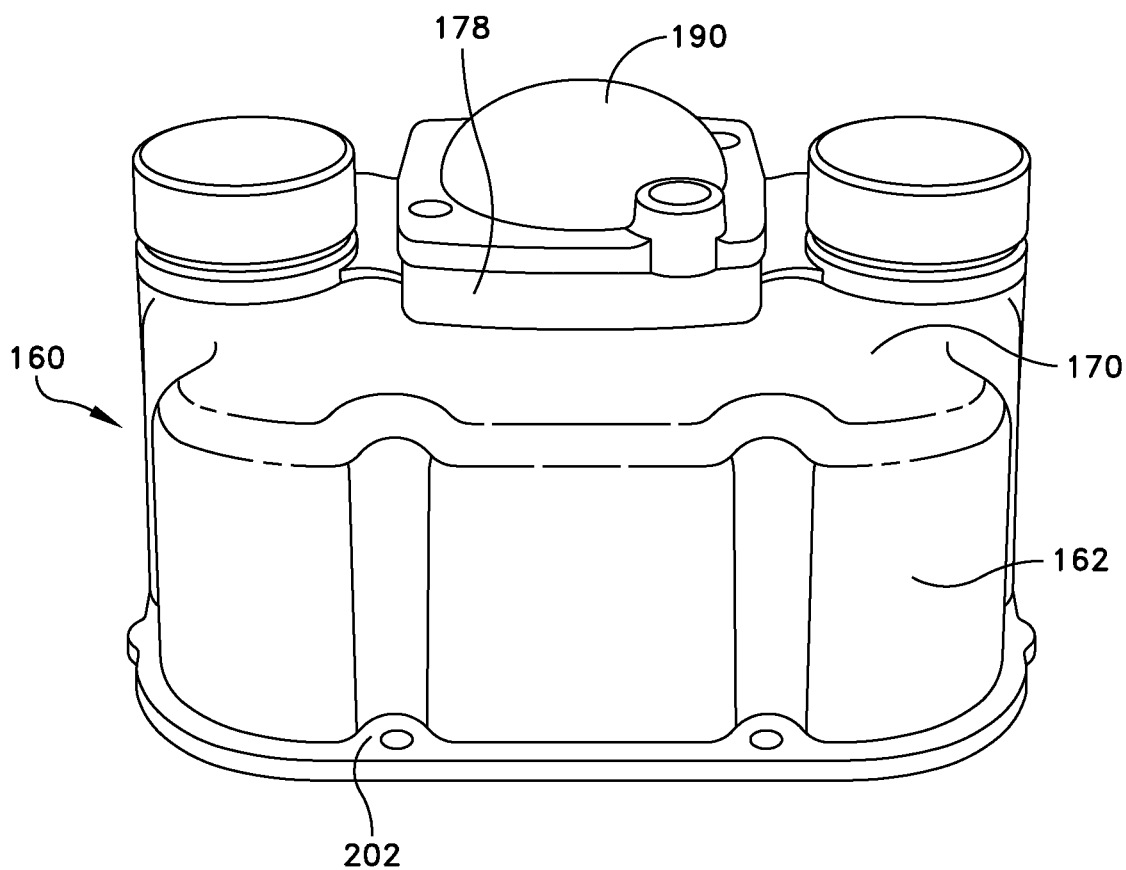
FIG. 4 is front view of an extended top assembly.

Extended top assembly 160 illustrated in FIG. 4 may be used to retrofit gas meter 1. For example, extended top assembly 160 may be dimensioned to fit on older gas meters advantageously enabling a utility company to add RF shut-off capability to older gas meters without the expense of replacing the entire meter that was otherwise normally functioning. Referring to FIGS. 2-11, one example of an improved gas meter 1 having remote shut-off capability is now described. Extended top assembly 160 includes an extended top body 162 having a gas inlet fitting 164 defining an inlet channel 204 and a gas outlet fitting 166 defining an outlet channel 206. The gas inlet and outlet fittings 164, 166 may be configured for connection to a gas line. The extended top body 162 defines an interior region or chamber 168 that is in fluid communication with the upper chamber 12 of the gas meter body 2. A gas shut-off valve assembly 174 is connected to inlet channel 204.

Figure 6:
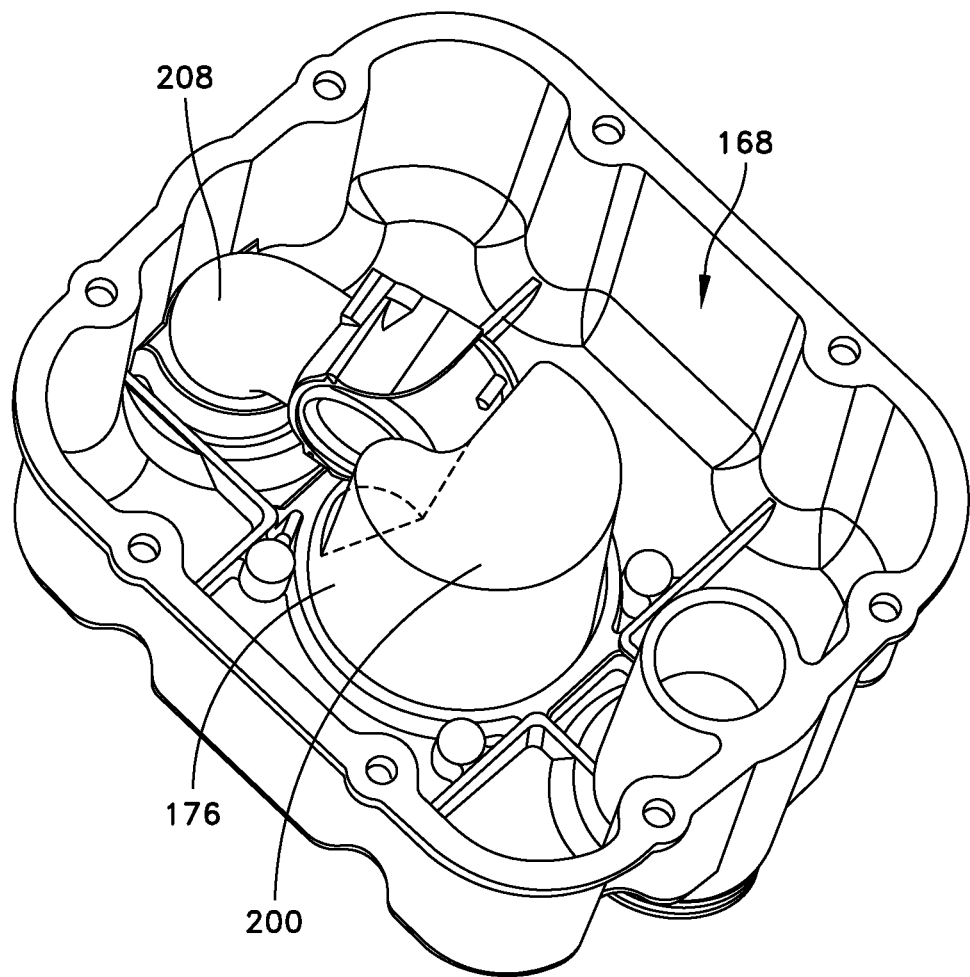
FIG. 6 is a bottom isometric view of the extended top assembly illustrated in FIG. 4 with a shut-off valve removed.
Figure 7:
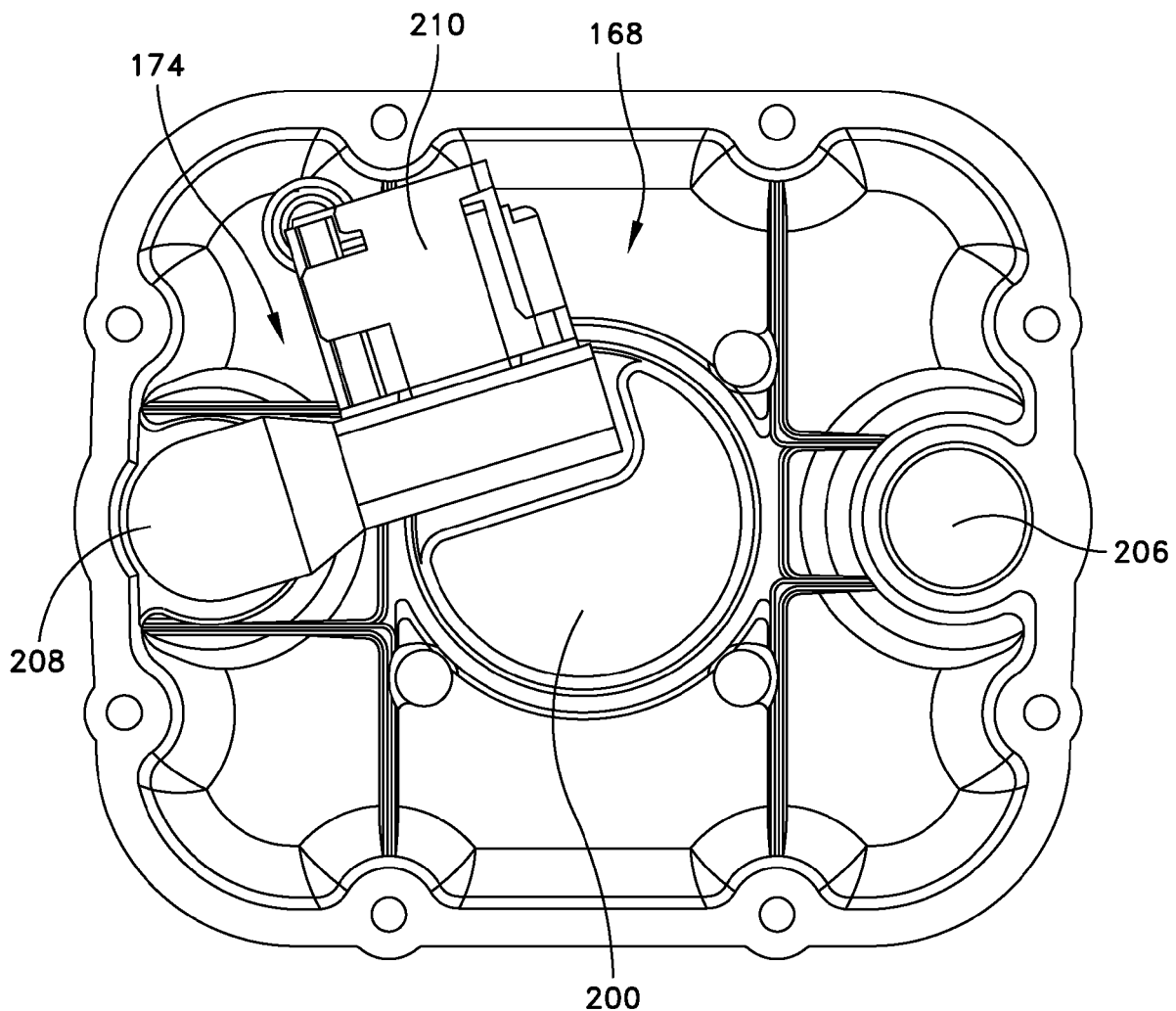
FIG. 7 is a bottom view of the extended top assembly illustrated in FIG. 4.

As best seen in FIGS. 3 and 6, the gas shut-off valve assembly 174 includes a channel adapter 208 and a shut-off valve 210. Valve 210 may be a solenoid valve, a stepper valve, ball valve, or the like. When the channel adapter 208 is connected to the inlet channel 204 of the extended top body assembly 160, the valve 210 may be advantageously arranged such that the gas flow pressure from the gas line will assist in maintaining the plunger 236 of the valve 210 in the closed position providing a better seal.

Figure 8:
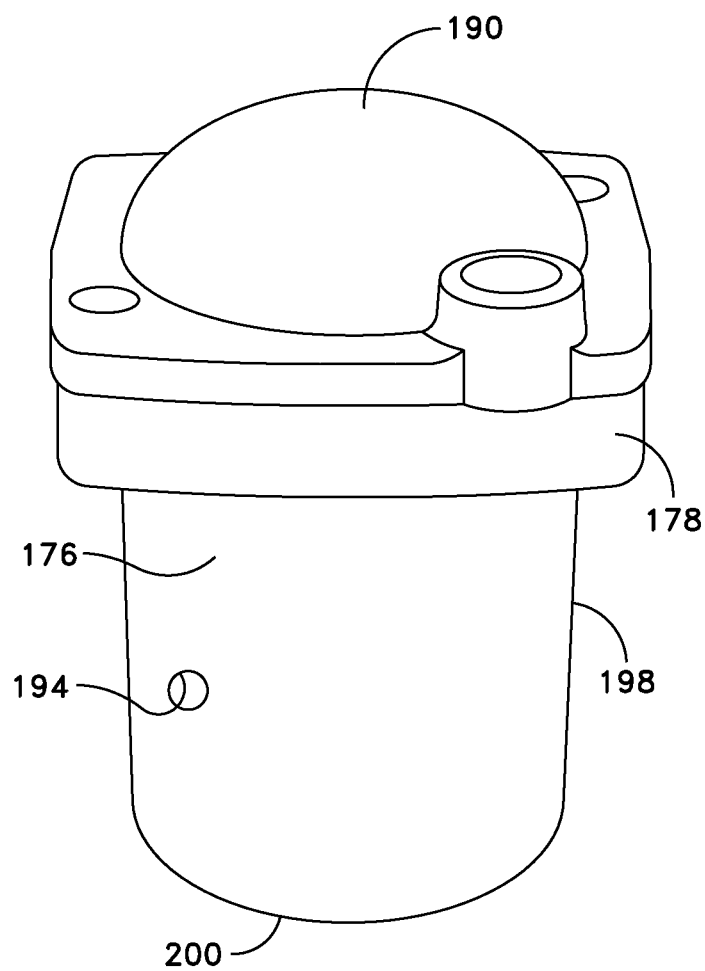
FIG. 8 is a front view of the cup and top of the extended top assembly illustrated in FIG. 4.

An opening, such as a recess or hand-hole, may be located in top surface 170 of extended top body 162. A cup 176, as best seen in FIG. 8, having a flange 178 may be sized to be received within opening. Flange 178 forms an interface with the top surface 170 of the extended top body and provides for an area in which cup 176 may be secured to extended top body 162 to form an airtight seal. In an another embodiment, cup 176 may be coupled to a bottom surface of the extended top body 162. Cup 176, extended top body 162, and gas meter body 2 may be manufactured from aluminum.

A gasket may be disposed between top surface 170 of extended top body 162 and a bottom surface of cup flange 178. Cup 176 may be secured to extended top body 162 using screws or other mechanical fastening means known in the art. In some embodiments, extended top body 162 and cup 176 are formed as an integral unit. If cup 176 and extended top body 162 are separate structures, gasket serves to provide an airtight seal between cup 176 and interior 168 of extended top body 162. One skilled in the art will understand that other features may be provided between the top surface 170 of extended top body 162 and cup 176 to provide an airtight seal.

Figure 5:
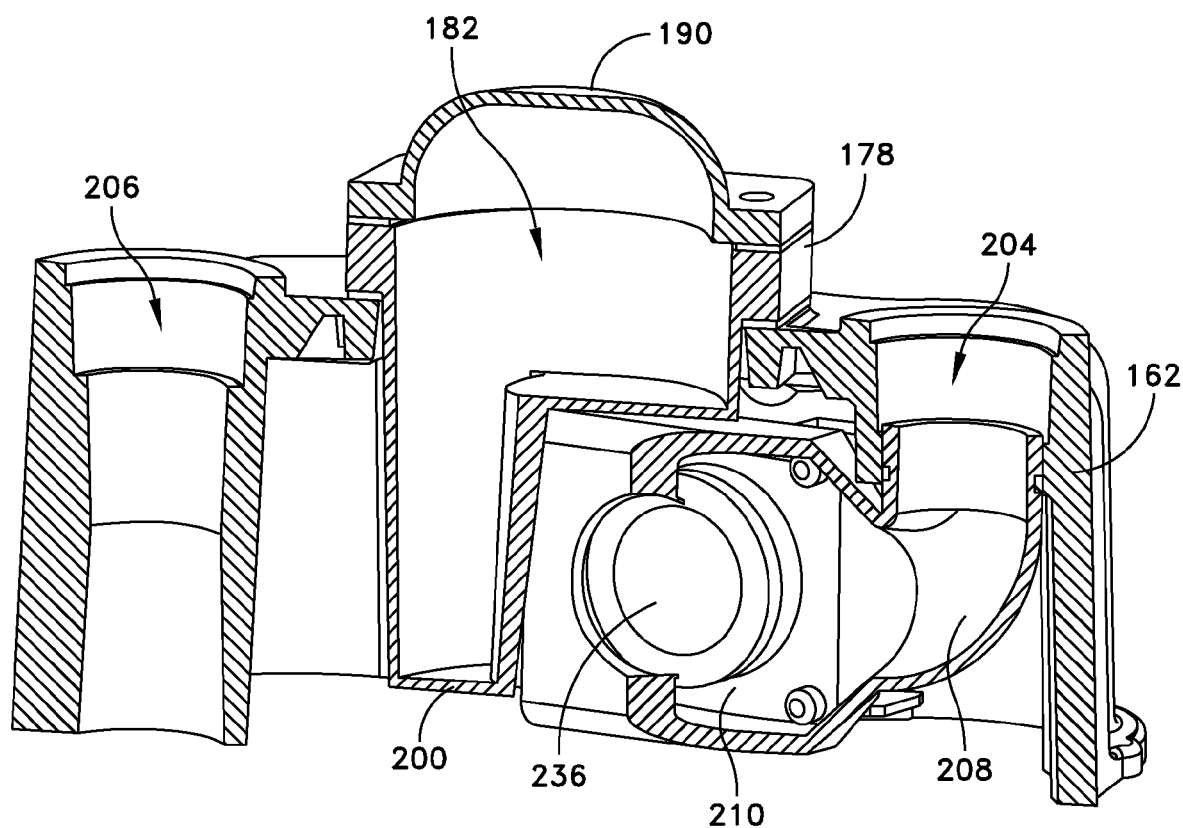
FIG. 5 is a sectional view of the extended top assembly illustrated in FIG. 4.

Cup 176 defines a compartment 182, as best seen in FIG. 5, that is sized to receive an RF controller 184 and a power supply such as one or more batteries for powering the RF controller 184 and the valve 210. In some embodiments, the RF controller 184 may be disposed on a single printed circuit board (PCB) such as the RF controller illustrated in FIG. 11. The RF controller 184 is secured within the cup 176 such that the antenna 186 of the RF controller 184 is located above the top of the extended top body to promote transmission and reception of RF signals. The RF controller may be secured within the cup 176 by providing guide slots, a clamp, a basket, or other means for attachment within the cup 176 such that leads or wires 232 for the RF controller may be coupled to the valve 210 as described below. In some embodiments, cup 176 has a circular cross-sectional geometry, although one skilled in the art will understand that cup 176 may have other cross-sectional geometries including, but not limited to, rectangular, oval, or the like. Cup 176 may taper along its length from a first width at its top to a second width at its bottom. The degree of the taper may be adjusted to ensure that cup 176 does not interfere with shut-off valve assembly 174 or with other functional components disposed within the gas meter body 2.

As best seen in FIG. 8, a hole 194 may be machined or otherwise formed in a side 198 or bottom 200 surface of cup 176. Hole 194 may receive a wire connector 196 or other interface for connecting RF controller 184 and the power supply, which may be disposed within cup compartment 182, to valve 210 that is disposed within the internal chamber 168 of extended top body 162.

Figure 9:
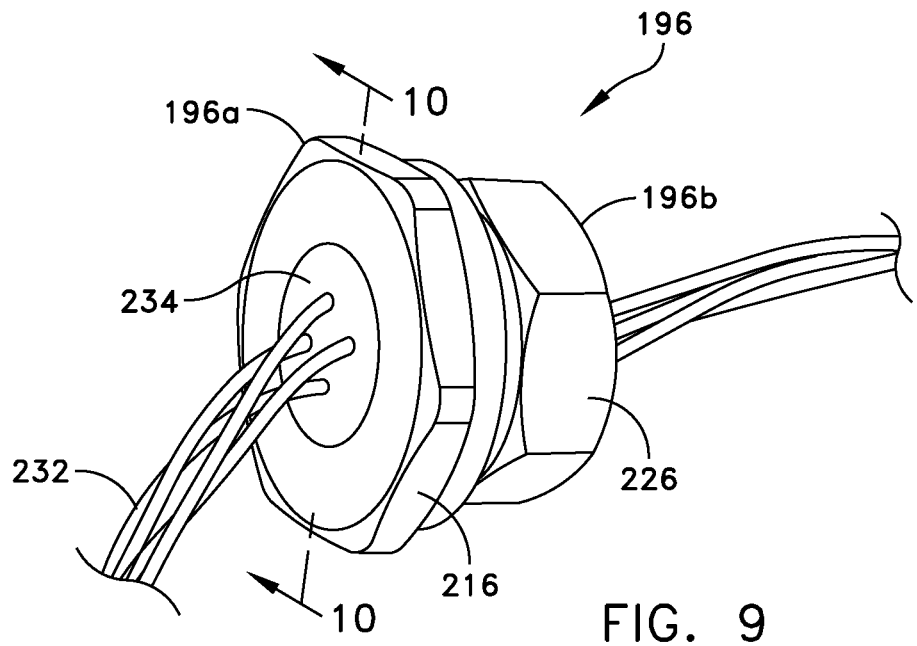
FIG. 9 is a front elevation of a wire connector in accordance with the extended top assembly illustrated in FIG. 4.
Figure 10:
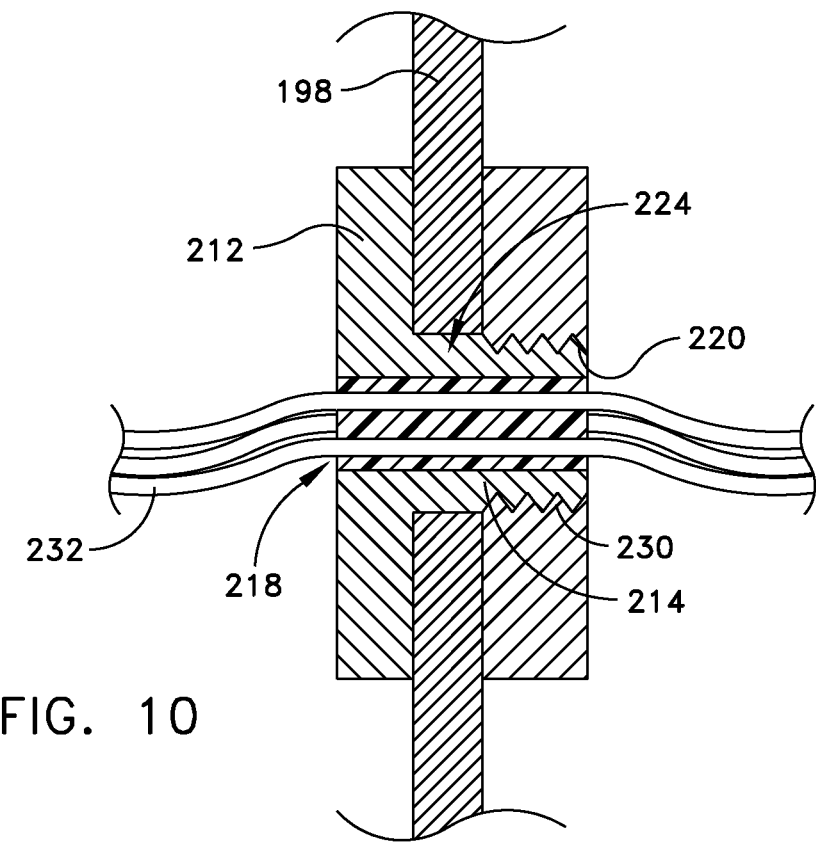
FIG. 10 is a sectional view along line 10-10 in FIG. 9 of the wire connector.
Figure 11:
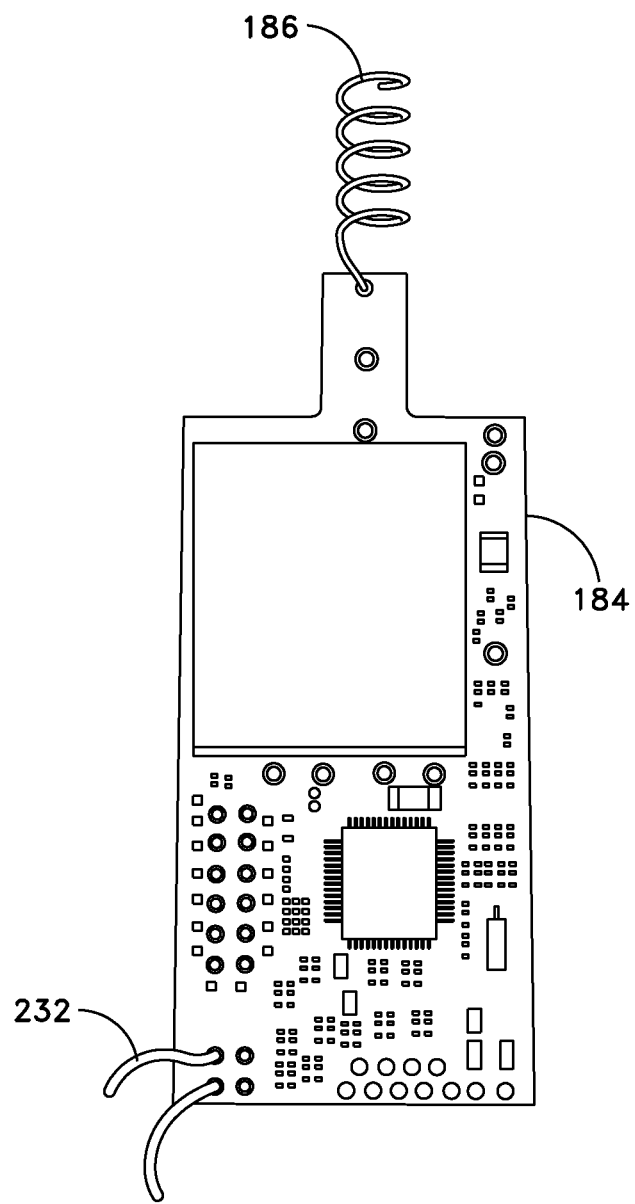
FIG. 11 is a plan view of a radio frequency controller.

FIGS. 9 and 10 illustrate one example of a two-piece wire connector 196 that may be implemented to enable wires 232 to pass through cup 176 while maintaining a pressure barrier between the internal chamber 168 of extended top body 162 and the cup compartment 182. As shown in FIGS. 9 and 10, first piece 196*a* may include a body 212 including an engagement surface 216, a shaft 214 including a threaded section 220 and a shoulder section 224. Engagement surface 216 may have a hexagonal shape such that it may be engaged by a wrench. One skilled in art will understand that engagement surface 216 may have a variety of geometries. A wire channel 218 is formed through the body 212 of the first piece 196*a* of wire connector 196.

Shoulder 224 may have a diameter that is approximately equal to the diameter of the hole 194 so that the shoulder 224 of the first piece 196*a* may be received within hole 194 with a press-fit or a slip-fit engagement. In some embodiments, an epoxy, resin, or other sealant may be used to maintain the shoulder 224 of the first piece 196*a* within the hole 194 and to ensure that a pressure barrier is formed between the cup compartment 182 and the interior chamber 168 of the extended top body 162.

As shown in FIGS. 9 and 10, the second piece 196*b* of the wire connector 196 may be a nut having internal threads 230 that correspond to the threads of the first piece 196*a* and a hexagonal engagement surface 226.

FIG. 10 is a sectional view taken along line 10-10 in FIG. 9 of the wire connector 196 installed within a hole 194 formed in the side surface 198 of cup 176. As shown in FIG. 10, the shoulder 224 of the first piece 196*a* is received within the hole 194. As described above, the shoulder 224 of the first piece 196*a* may sized such that the shoulder 224 is received within the hole 194 through a press-fit engagement and may be secured using an epoxy, resin, or like sealant. The second piece 196*b* may be joined to the first piece 196*a* by screwing the second piece 196*b* onto the first piece 196*a*. Power and signal wires 232 for the valve 210 may be received within the wire channel 218 of the first piece 196*a* of the wire connector 196. The wires 232 may be sealed within the wire channel 218 using a sealant 234, such as an epoxy or resin, to secure the wires 232 within the wire channel 218 and to create a pressure barrier between the internal chamber 168 of the extended top body and the cup compartment 182. One skilled in the art will understand that other connectors may be used to connect the valve 210 with the power supply and RF controller 184 disposed within the cup compartment 182.

With cup 176 in place, a service technician or other utility company employee may advantageously service the RF controller 184 or adjust or replace the power supply (e.g., one or more batteries) for the electronics that are disposed in cup compartment 182 without disturbing the pressure in the gas meter body 2. Maintaining the pressure within gas meter body 2 prevents the need to recertify or recalibrate the gas meter when performing maintenance of the electrical components in the extended top assembly 160.

RF controller 184 may be any RF device capable of sending and/or receiving RF signals to and from a remotely located RF transceiver. Examples of a suitable RF controller 184 include, but are not limited to, a Wavecard™ available from Coronis Systems, Inc. of Chicago, Ill. and an EnergyAxis available from Elster Solutions, LLC. of Raleigh, N.C. RF controller 184 may be capable of sending electrical signals via a wired connection to valve 210. Additionally, RF controller 184 may be configured with a messaging protocol that enables it to communicate with an RF transceiver, which may be used by a utility company employee to send an instruction to close valve 210. The messaging protocol may be configured to enable a utility company employee to remotely close valve 210. In some embodiments, the module for wireless communication with the RF transceiver is disposed on a separate circuit board than the module for controlling the opening and closing valve 210. These separate modules may be coupled together within cup 176.

RF controller 184 may be configured to prevent the opening of valve 210 unless the employee enters an activation code that is specific gas meter 1. The activation code may be permanently located within cup compartment 182 or on the underneath part of cover 190. Placing or locating the activation code inside cup compartment 182 that is sealed by cover 190 provides an enhanced safety feature by requiring an experienced technician to be on-site when the gas valve is opened.

In some embodiments, RF controller 184 may transmit an acknowledgement signal after receiving a signal to open or close the shut-off valve in response to a signal received from an RF transceiver. If the RF transceiver does not receive the acknowledgement signal, then it may indicate to the service technician that the RF controller 184 is not properly operating, e.g., the RF controller 184 is shielded or has lost power. One skilled in the art will understand that other RF signals may be used by the RF controller 184 to determine if the gas meter 1 is being shielded to prevent remote turn off by the utility.

Valve 210 may be any device configured to open and close to prevent gas from flowing into and/or out of gas meter 1 in response to an electrical signal received from RF controller 184. As described above, valve 210 may be a solenoid valve, a stepper valve, a ball valve, or the like. Valve 210 may be powered by a battery or other power supply located within the cup compartment 182. Electrical leads may be connected to wire connector 196 so that valve 210 may receive electrical signals from RF controller 184.

A cover 190 is provided to secure the RF controller 184 and power supply within compartment 182 of cup 176. In some embodiments, cover 190 is formed from a plastic, polymer, or other material that enables the propagation of RF signals therethrough. Additionally, cover 190 may have a size or shape that enables the antenna 186 of RF controller 184 to be located within the extended top body 162 such that it may transmit and receive RF signals. For example, the cover 190 may have a domed shape or have a protrusion that enables antenna 186 of RF controller 184 to be disposed above the top surface 170 of the top of the extended top body 162. Cover 190 may be secured to top surface 170 of extended top body 162 with tamper devices 192 to prevent a customer from tampering with RF controller 184.

When installed, the utility company may remotely close the valve 210 by using a wireless transceiver eliminating the need for an employee to enter the property or building where the gas meter 1 is located. As described above, the RF transceiver may send a command to the RF controller 184 in the form of an RF signal. The RF signal may be unique to the specific gas meter 1 that the employee is trying to turn-off or close to prevent the closing of a similarly configured gas meter in an adjacent property or building.

Upon receiving the RF signal from the RF transceiver, the RF controller 184 may process the signal and transmit an electrical signal to the valve 210, which in turn will close either the gas inlet channel 204 or gas outlet channel 206. The valve 210 will remain in the off position until the RF controller 184 sends the appropriate electrical signal to the valve 210 causing the valve 210 to transition from the closed position to the open position. As described above, the RF controller 184 may be configured to maintain the valve 210 in a closed state until it receives an RF signal including the unique activation code. Embossing, stamping, or otherwise including the activation code sealed within the cup compartment 182 or underneath the cover 190 prevents the gas from being turned on in the absence of a trained technician who may remove the cover and perform a safety check prior to turning on the gas to prevent an explosion or an improper release of gas into the building.

In some embodiments, the extended top assembly 160 may be used to retrofit older gas meters. For example, the extended top assembly 160 may be dimensioned to fit on older gas meters advantageously enabling a utility company to add RF shut-off capability to an older fleet of gas meters without the expense of replacing the entire meter that was otherwise functioning normally.

The improved gas meter and extended top assembly described above advantageously enable a utility company to remotely shut-off the gas without having to enter the property or building where the gas meter may be located in the event that a customer fails to pay his or her bill, if construction is being performed in a surrounding area, or for other reasons. Additionally, the RF controller of the gas meter may be configured to determine when a customer has shielded or otherwise prevents the RF controller from receiving RF signals in an attempt to prevent the turning off the gas. The extended top assembly may also be used to retrofit older gas meters to provide utility companies the benefit of remote shut-off capability without the expense of replacing every gas meter. The airtight seal formed by the extended top when installed advantageously enables the electrical components disposed within the cup chamber to be replaced without the need to recertify the gas meter as the pressure within the gas meter is maintained.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A retrofit gas meter, comprising:
    a gas meter including
        a bottom wall and a plurality of side walls that together form a body of the gas meter that defines an interior chamber that is divided into an upper chamber and a lower chamber by a valve plate including a plurality of ports to provide fluid communication between the upper chamber and the lower chamber, the lower chamber being divided into a front chamber and a rear chamber by a central partition extending between the valve plate and the bottom wall;
        a diaphragm disposed within the lower chamber and having an inlet port and an outlet port; and
        flags and arms connected to the diaphragm that are configured to control a flow of gas through the gas meter; and
    a retrofit system connected to the gas meter, the retrofit system including
        a body having a top wall and a plurality of side walls defining a second chamber, an outlet channel, and an inlet channel, the body connected to the body of the gas meter such that the upper chamber and the second chamber form an enlarged upper chamber, the inlet channel in fluid communication with the inlet port of the diaphragm, and the outlet channel in fluid communication with the outlet port of the diaphragm;
        a cup disposed within an aperture defined by the body of the retrofit system, the cup defining an compartment sized and configured to receive a radio frequency (RF) controller and a power supply, the cup including a wire connector configured to maintain a pressure boundary between the compartment and the enlarged upper chamber; and
        a valve disposed within the enlarged upper chamber and connected to one of the inlet channel or the outlet channel, the valve electrically coupled to the RF controller and the power supply, the valve configured to open and close in response to an electrical signal received from the RF controller via at least one wire that extends through the wire connector.

2. The retrofit gas meter of claim 1, further comprising a cover configured to encase the RF controller and power supply within the compartment of the cup.

3. The retrofit gas meter of claim 1, wherein the gas meter body and the body of the retrofit system are formed from aluminum.

4. The retrofit gas meter of claim 2, wherein the cover is formed from a material that enables RF propagation.

5. The retrofit gas meter of claim 1, wherein an interface between the cup and the body of the retrofit system is airtight.

6. The retrofit gas meter of claim 5, wherein the cup and the body of the retrofit system are monolithic.

7. A retrofit system for a gas meter, comprising:
    a body having a top wall and a plurality of side walls defining an opening and a chamber, the body configured to be connected to a body of a gas meter such that the chamber is in fluid communication with an upper chamber of the gas meter to provide an enlarged upper chamber that is fluid communication with a lower chamber of the gas meter in which a diaphragm is disposed, the body including an inlet channel configured to be in fluid communication with an inlet of the diaphragm disposed within the gas meter and an outlet channel configured to be in fluid communication with an outlet of the diaphragm;
    a cup disposed within an aperture defined by the body, the cup defining an compartment sized and configured to receive a radio frequency (RF) controller and a power supply, the cup including a wire connector configured to maintain a pressure boundary between the compartment and the chamber; and
    a valve connected to one of the inlet channel or the outlet channel, the valve electrically coupled to the RF controller and the power supply, the valve configured to open and close in response to an electrical signal received from the RF controller via at least one wire that extends through the wire connector.

8. The retrofit system of claim 7, further comprising a cover configured to encase the RF controller and power supply within the compartment of the cup.

9. The retrofit system of claim 7, wherein the body is formed from aluminum.

10. The retrofit system of claim 8, wherein the cover is formed from a material that enables RF propagation.

11. The retrofit system of claim 7, wherein an interface between the cup and the top wall of the body is airtight.

12. The retrofit system of claim 7, wherein the cup and the body are monolithic.

13. The retrofit system of claim 7, wherein the compartment defined by the cup is isolated from the chambers.

14. A method of retrofitting a gas meter, comprising:
   removing a cover of a gas meter to expose an upper chamber of the gas meter that is separated from a lower chamber of the gas meter by a valve plate, the lower chamber being divided into a front chamber and a rear chamber by a central partition that extends from the valve plate to a bottom wall of the gas meter; and
   securing a retrofit system to the gas meter to cover the upper chamber, the retrofit system including:
      a body having a top wall and a plurality of side walls defining an opening and a chamber that creates an enlarged upper chamber with the upper chamber of the gas meter, the body including an inlet channel configured to be in fluid communication with an inlet of a diaphragm disposed within the lower chamber of the gas meter and an outlet channel configured to be in fluid communication with an outlet of the diaphragm;
      a cup disposed within an aperture defined by the body, the cup defining a compartment sized and configured to receive a radio frequency (RF) controller and a power supply, the cup including a wire connector configured to maintain a pressure boundary between the compartment and the enlarged upper chamber; and
      a valve connected to one of the inlet channel or the outlet channel, the valve electrically coupled to the RF controller and the power supply, the valve configured to close in response to an electrical signal received from the RF controller via at least one wire that extends through the wire connector.

15. The method of claim 14, wherein the retrofit device further includes a cover for encasing the RF controller and power supply within the compartment of the cup.

16. The method of claim 14, wherein the compartment defined by the cup is isolated from the chamber and the internal chamber of the gas meter.

17. The method of claim 14, wherein the body of the retrofit system is greater in size than the cover of the gas meter.

* * * * *